United States Patent [19]

Keathley

[11] 4,344,901
[45] Aug. 17, 1982

[54] METHOD OF MAKING TOOL HANDLE

[75] Inventor: Bob N. Keathley, Bernie, Mo.

[73] Assignee: IXL Manufacturing Co., Inc., Bernie, Mo.

[21] Appl. No.: 278,939

[22] Filed: Jun. 30, 1981

Related U.S. Application Data

[62] Division of Ser. No. 67,260, Aug. 17, 1979, Pat. No. 4,287,640.

[51] Int. Cl.³ ............................................... B29C 6/04
[52] U.S. Cl. ......................................... 264/23; 264/25; 264/26; 264/261; 264/262; 264/265
[58] Field of Search .................... 264/22, 23, 25, 26, 264/261, 262, 265

[56] References Cited

U.S. PATENT DOCUMENTS 2,656,225 10/1953 Saylor ................................... 306/20
3,877,826 4/1975 Shepherd, Jr. et al. ............ 403/267
3,962,399 6/1976 Shepherd, Jr. et al. ............ 264/262

*Primary Examiner*—James B. Lowe
*Attorney, Agent, or Firm*—Neil F. Markva

[57] ABSTRACT

An elongated tool handle has a solid wood shaft member and a molded, tool holding section molded directly to the wood at the tool end portion of the shaft member. The tool holding section is composed of a high impact material which is effective to secure a tool in place on the tool holding section. The tool holding section includes a volumetric mass of high impact material which gives off an amount of heat in its molten condition effective to drive moisture out of kiln dried wood. The wood of the shaft member has an amount of moisture sufficient to maintain the natural handle strength characteristics of the wood with the tool holding end section molded directly thereto. When the tool having an eye for the reception of the handle is placed over the molded, tool holding section, a slight outward expansion occurs in the material behind the tool head. A novel method is required to produce the tool handle with a molded tool holding section molded directly to a wood shaft.

15 Claims, 19 Drawing Figures

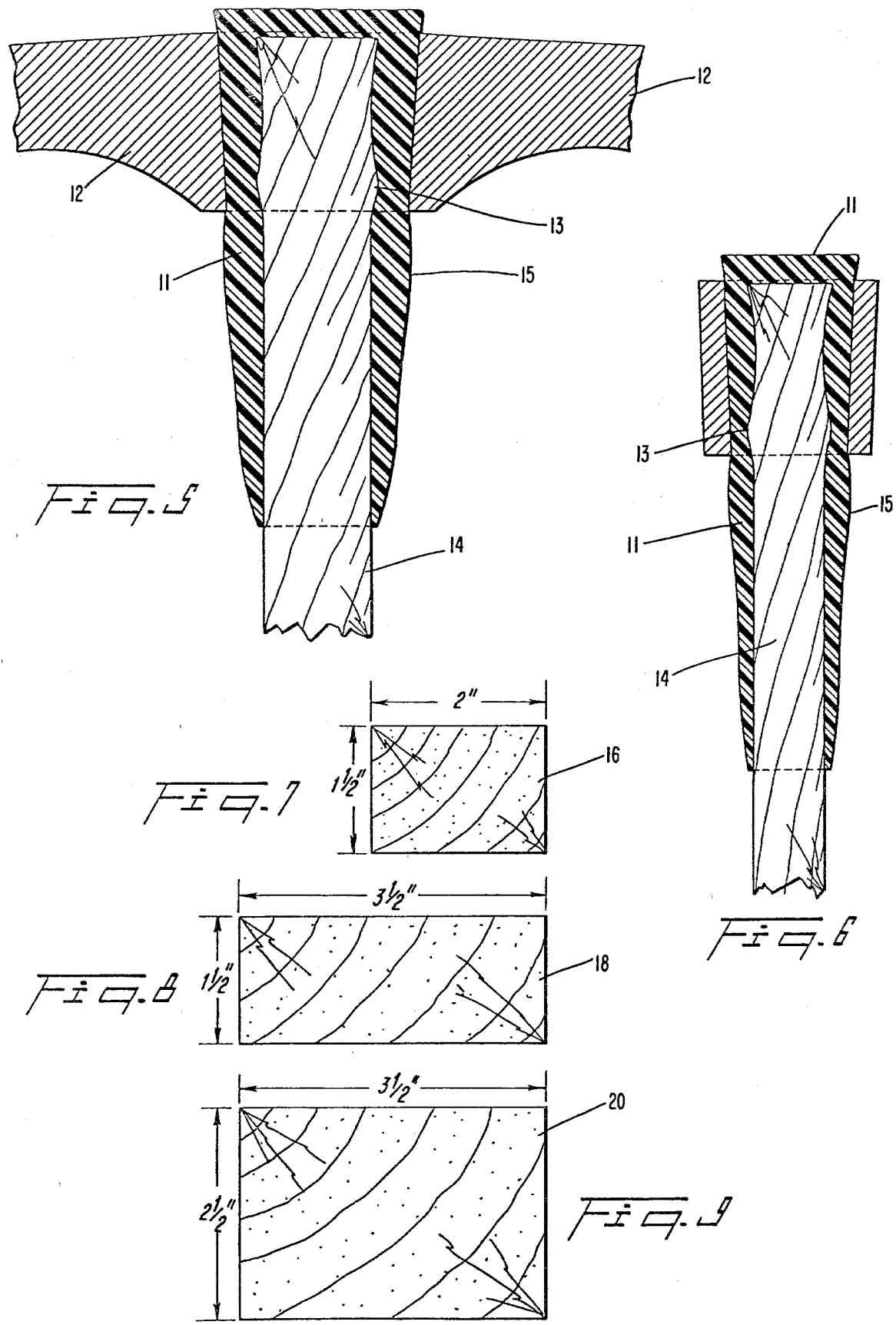

U.S. Patent  Aug. 17, 1982  Sheet 3 of 4  4,344,901
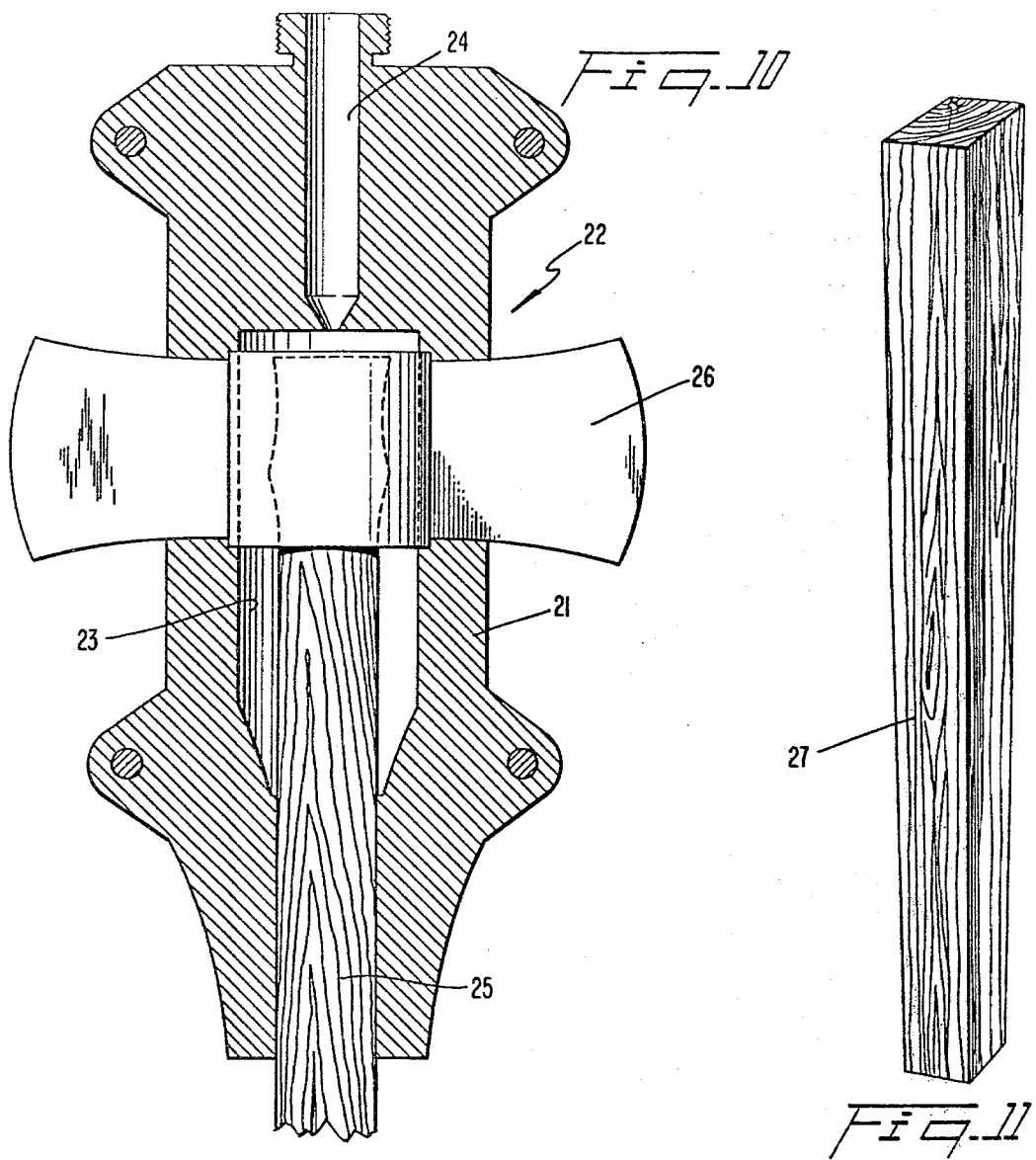
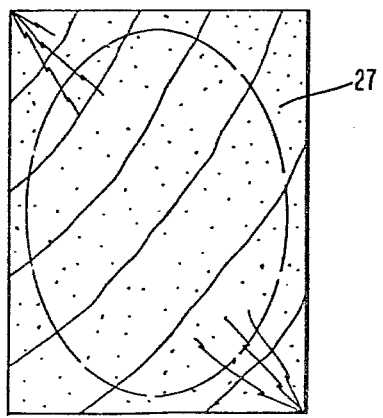
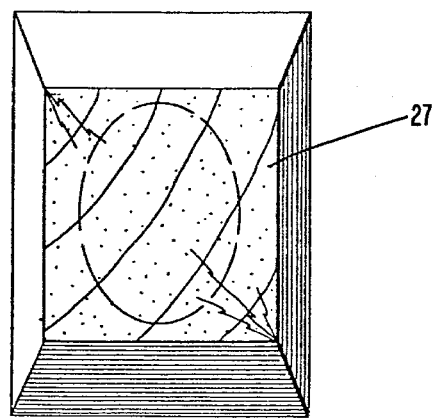

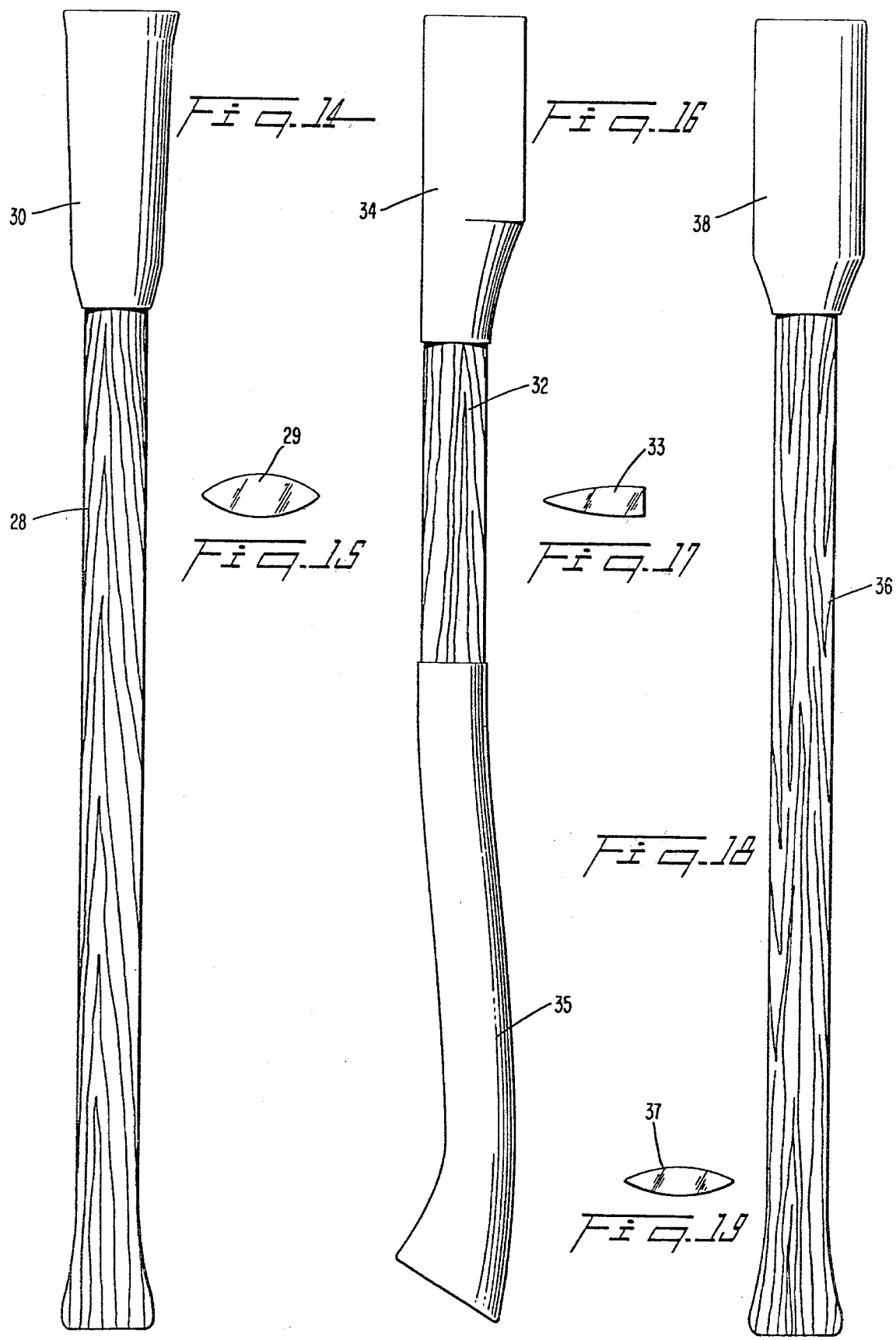

METHOD OF MAKING TOOL HANDLE

This is a division of application Ser. No. 67,260 filed Aug. 17, 1979 now U.S. Pat. No. 4,287,640 issued Sept. 18, 1981.

FIELD OF THE INVENTION

The present invention relates generally to elongated handles for tools such as pick axes, single and double axes, and the like. More specifically, the invention is directed to tool handles having a solid wood shaft member having a high impact material molded directly thereto to accomplish a particular purpose.

BACKGROUND OF THE INVENTION

For many years, the tool handle industry has used solid wood handles for tools such as sledge hammers, pick axes, and the like. More specifically, hickory wood is used because it is lightweight, resilient and extremely strong providing optimum physical characteristics for use in such implements. Many attempts have been made to find synthetic materials to provide a tool handle that is equal to or constitutes an improvement in physical characteristics obtained in using hickory wood for these handles. However, to date, none has been found.

The reinforced tool handle of U.S. Pat. No. 2,837,381 has the problem of twisting about the longitudinal axis of the handle during use of the striking instrument. The fiberglass reinforced tool handle of U.S. Pat. No. 2,940,492 is extremely heavy and does not dampen the shock to the same degree as the wood handle. The completely molded handle disclosed in U.S. Pat. No. 3,770,033 has also been found to be an unsatisfactory substitute for the wood handle.

The U.S. Pat. No. 3,712,659 discloses a wood handle having a coating of synthetic material on a core member. In this particular instance, the synthetic material is an epoxy resin coating. This coating is simply given to provide an insulating or impact cushioning hand portion and prevent exposure of weather to the wood core. The coating provides no additional strength characteristics to the wood core. The same is true of the wood core articles disclosed in U.S. Pat. No. 3,220,731. There, a particular application of a film of an amylose solution is applied before coating the wood core with a resinous composition.

The standard prior art pick handle consists of a single piece of wood that is about 36 inches along and elliptical in cross section. The dimensions of such handles are established by Government specifications and the elliptical cross sections vary according to their location along the handle.

The end on which the pick head is disposed flares outwardly from the stem of the handle to dimensions of $3\frac{1}{8}$ inches along the major axis and $2\frac{1}{8}$ inches along the minor axis. The pick head has an eye which also flares outwardly. The pick head implement is placed over the butt end of the handle and slipped over the flared end portion thereof. The pick head tool fits tightly because the tool holding end portion is flared in the same manner as the eye or opening of the tool itself. The head is wedged even more tightly on the handle as it is used because of the outward centrifugal force that is generated when the pick implement is swung.

According to the production methods of the prior art, a pick handle requires a blank of correct length which is tapered from dimensions of $3\frac{1}{2}$ inches $2\frac{1}{2}$ inches at the head to 2 inches by 2 inches at the butt end. Because the blank is too large to be kiln dried before it is turned to the desired dimensions, the handle is turned from a green piece of wood. The turned green handle is then kiln dried resulting in blanks which shrink in varying amounts. That is, the kiln dried green turned handles will not have a uniform size with a variance of up to about plus or minus 1/16 inch.

Using this process, one man can generally produce approximately 400 pick handle blanks per day. The pick handle blank has approximately 0.6 to 0.65 board feet of hickory after it has been turned in a wood lathe and finished. The rough cut blank from which this pick handle is cut has an initial size of approximately 2.0 board feet. Thus, there is a tremendous amount of waste associated with the prior art processing. The supply of hickory is limited because it is grown only on the North American continent.

As it has been recognized in industry, there is a long felt need for a tool handle having the strength and durability of wood without being severely limited by the supply of hickory which is particularly used in the striking or percussion implements such as pick axes. No one has directed any effort to reducing the amount of wood required in such a tool handle until the present invention.

PURPOSE OF THE INVENTION

The primary object of this invention is to provide a tool handle having a solid wood shaft member which may be turned from a uniform wood blank that is substantially smaller than the tapered blank presently used in the pick axe handle industry.

Another object of the invention is to provide a tool handle which may be manufactured in such a manner as to eliminate substantial waste now associated with present methods of producing tool handles.

A further object of this invention is to provide an elongated tool handle for a tool having an eye for the reception of a handle wherein the handle is more durable than the all hickory tool handles now being produced.

SUMMARY OF THE INVENTION

The elongated tool handle of this invention comprises a solid wood shaft member having a tool end portion and a butt end portion with a molded tool holding section molded directly to the wood at the tool end portion. The tool holding section is composed of a high impact material which is effective to secure a tool in place on the tool holding section.

As shown in U.S. Pat. No. 3,877,826, it is known to use a tough, hard and rigid injection molded thermoplastic material in the space between the eye of an impact tool and the end portion of the standard handle to effect a connection therewith. The entire purpose of this operation is simply to form a mechanical lock between the handle and the head member. This process does not recognize the particular problems associated with the manufacture of striking implements such as single and double bit axes and pick axes nor is there any indication that the particular procedure used in this prior art process would actually be effective to accomplish the results of the invention as described herein. This prior art process requires only high pressure for inserting the molten plastic into the eye of the tool handle without requiring any large amounts of heat.

The present invention substantially reduces the required size of a wood blank and provides for forming a tool holding section composed of a high impact material which is effective to secure a tool in place on the tool holding section. The volumetric mass of material in the tool holding section gives off an amount of heat in its molten condition that is effective to drive moisture out of kiln dried wood. When that moisture in the kiln dried wood is driven out, the mass of material molded directly to the wood is destroyed by the escaping gases. Consequently, the procedures described in the prior art clearly are not applicable to such an elongated tool handle.

Finally, the tool handle of this invention is extremely favorable because the wood of the shaft member has an amount of moisture sufficient to maintain the natural handle strength characteristics of the wood even with such a volumetric mass forming the tool holding end section molded directly to the wood. It has been found that by reducing the moisture level of the kiln dried wood blank along a delimited length, such a volumetric mass can be molded directly to the wood. Kiln dried wood normally has a moisture content of from about 12 to 18% by weight. The molten high impact material is injected into a mold cavity in which the delimited length of blank has been placed. Once the temperature of the material has lowered for the mass to hold its shape, it is removed from the mold and quenched in water at ambient temperatures.

Obviously, this problem is not associated with those instances where the volumetric mass of the molten material does not give off an amount of heat in its molten condition effective to drive moisture out of kiln dried wood. Thus, none of the prior art procedures have recognized such a problem nor have they developed any techniques which would overcome such a problem. Furthermore, simply following the recognized teachings in the prior art would not result in obtaining an elongated tool handle having a tool holding section composed of a high impact material molded directly to the wood.

A tool handle made for a pick axe in accordance with this invention has a tool holding section including a tool seating area and an overstrike region extending toward the butt portion beyond the tool seating area. The overstrike region composed of high impact molded material provides significant shock absorption characteristics which are not now available with all wood tool handles of this type. Furthermore, the overstrike region in the tool handle of this invention provides a securing means when the tool itself is disposed within the tool seating area. The securing means comprises a slightly outward expansion of the molded material behind the tool thereby providing a characteristic heretofore unavailable in any similar striking implements.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 5 is a fragmentary cross sectional view along the major axis of a pick axe made in accordance with this invention;

FIG. 6 is a fragmentary cross sectional view along the minor axis of the pick axe shown in FIG. 5;

FIGS. 7, 8, and 9 are top plan views of prior art blanks used for producing sledge handles, double blade axe handles, and pick axe handles, respectively;

FIG. 10 is an elevational view of a head and shaft combination disposed in an empty mold cavity before the injection molding operation;

FIG. 11 is a perspective view of a tapered wood blank for producing a prior art wood pick axe handle;

FIG. 12 is a top plan view of the blank of FIG. 11;

FIG. 13 is a bottom plan view of the blank of FIG. 11;

FIGS. 14 and 15 are an elevational view and a tool end plan view, respectively, of a pick axe handle made in accordance with this invention;

FIGS. 16 and 17 are an elevational view and a tool end plan view, respectively, of a single bit axe handle made in accordance with this invention; and FIGS. 18 and 19 are an elevational view and a tool end plan view, respectively, of a double bit axe handle made in accordance with this invention.

DETAILED DESCRIPTION

Figure 1:
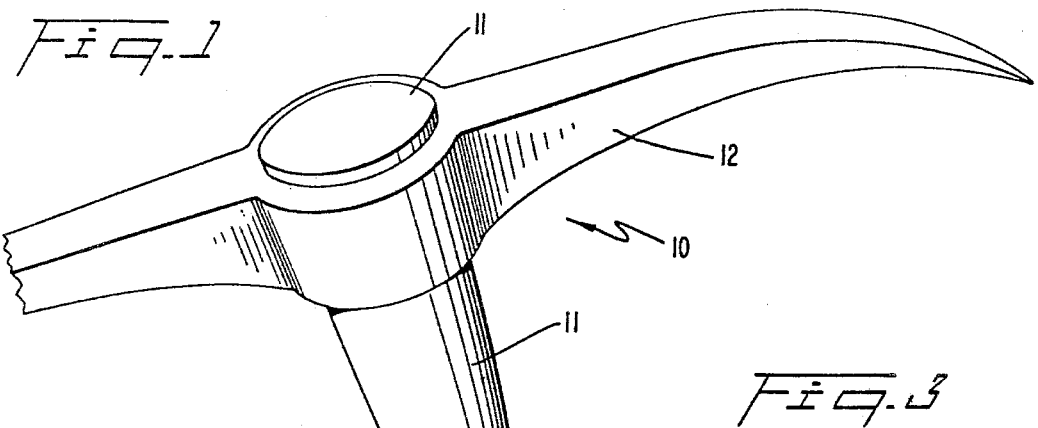
FIG. 1 is a fragmentary perspective view of a pick axe made in accordance with this invention.

The pick axe implement, generally designated 10, comprises a tool 12 disposed on a tool holding section 11 molded directly to a solid wood shaft member 14. Tool holding section 11 is located at the tool end portion of shaft 14 and is composed of a high impact material which is effective to secure tool 12 in place. The high impact material in this particular embodiment is a thermosetting resin, namely, a rubber modified polystyrene material. Any other equivalent high impact material may be equivalently used and is within the contemplation of this invention.

The tool holding section 11 has an overstrike region which extends toward the butt portion of handle 14 beyond the tool seating area on which tool 12 is disposed. Shaft member 14 includes a stop means constituted by ridge 13 located at the tool end portion within the tool holding section 11 to aid in securing the molded material in place. Tool holding section 11 has a volumetric mass of material which gives off an amount of heat in its molten condition effective to drive moisture out of kiln dried wood. At the same time, once the material is molded directly in place on shaft member 14, the moisture of shaft 14 in the wood is at an amount sufficient to maintain the natural handle strength characteristics of the wood with the tool end section 11 molded directly thereto. The greatest width of shaft member 14 throughout its length is less than about two inches and the least width of shaft member 14 is about one and three-quarter inches.

Kiln dried wood has a moisture content of from about 12 to 18% by weight as determined by moisture meters available in the prior art. This moisture content is standard throughout the industry and it is well known that certain characteristics are maintained in the wood through the presence of the moisture. The natural handle strength of prior art wood handles is defined herein as the strength of the wood demonstrated through normal use when the entire handle is composed of wood without a high impact material molded thereto. The natural handle strength is associated with the ability to withstand shock of impact and to prevent transfer of shock to the user of the implement having such a handle. Hickory wood inherently has strength and resiliency to provide good dynamic qualities which have not yet been attained in synthetic materials used to produce tool handles. The natural handle strength as defined herein is necessarily associated with the density of the wood, its grain structure and the moisture content. The moisture content is a critical factor in the wood handle. In the elongated tool handle in the present application, the wood of the shaft member has an amount of moisture sufficient to maintain the natural handle strength characteristics of the wood with the tool end section molded directly thereto. This is in spite of the fact that the volumetric mass of the tool holding section will give off an amount of heat in its molten condition effective to drive moisture out of the kiln dried wood. Herein lies the basic unexpected results achieved in the present case.

When the pick axe tool 12 is in place as shown in FIGS. 5 and 6, there is a slight expansion 15 which takes place in the overstrike region which extends toward the butt portion of shaft 14 beyond the tool seating area. This unexpected presence of a securing means in the molded high impact material molded directly to the wood of shaft 14 provides a securing means for the tool head disposed in the tool seating area as shown. This is a new and unexpected result that is not achieved in any prior art structure. There have been situations where the intentional overstriking of a pick axe handle with the head attached in an attempt to remove the tool head therefrom has been completely unsuccessful. Attempts have been made to intentionally break the handle by striking same with the tool head thereon in the overstrike region. In one instance, after more than thirty attempts, the handle still did not break and the tool head finally had to be removed through cutting off the handle.

Three different sizes of wood blanks 16, 18 and 20 are shown respectively in FIGS. 7, 8 and 9. Blank 16 is used in the prior art to form sledge hammer handles. Blank 18 is used to form single and double bit axe handles. Blank 20 is required to form a prior art wood pick axe handle. Blank 20 is cut to a tapered configuration 27 as shown in FIGS. 11 through 13. The tapered blank configuration 27 enables the pick handle to be the required minimum diameter of about 1 11/16 inches along its minor axis and to its required dimension of just under two inches for the major axis thereof. With the invention as described herein, it is now possible to form the double and single bit axe handles and the pick axe handles from a blank which is the same size as that now used for the production of sledge hammers. Such handles are shown in FIGS. 14, 16 and 18. The pick axe handle shown in FIG. 14 has a tool holding section 30 disposed on the wood shaft 28. The top end 29 of the tool holding section 30 is shown in FIG. 15. The straight shaft member 32, with the invention as it has been developed herein, may now have the tool holding section 34 and a handle portion 35 molded and formed directly onto the wood of the shaft 32. The shape of the end 33 of tool holding section 34 is shown in FIG. 17. The double bit axe handle shaft 36 has a tool holding section 38 disposed thereon with the end 37 thereof shown in FIG. 19. Each one of these tool holding sections 30, 34, 38 and the butt end section 35 includes a volumetric mass of material which gives off an amount of heat in its molten condition effective to drive moisture out of kiln dried wood. On the other hand, the wood of the shaft members have an amount of moisture sufficient to maintain the natural handle strength characteristics of the wood with the volumetric mass molded directly thereto. In other words, with the invention as disclosed herein, many new types of structures are available which will enable the tool handle industry to greatly reduce the amount of wood required to prepare the axe handles as shown in FIGS. 14, 16 and 18.

The particular method of producing an elongated tool handle of this type is also new. An elongated blank of kiln dried wood is first formed so as to include the natural handle strength characteristics of wood handles. The accepted moisture content of kiln dried wood is from about 12 to 18% by weight. The particular end or portion of the kiln dried wood on which the high impact material is to be molded is then specially treated according to the present invention. That is, the moisture level of the kiln dried wood is reduced along a delimited length of the elongated blank. The moisture reduced delimited length is then placed into a mold cavity. A molten, high impact material is then injected into the mold cavity to secure the material directly to the wood in the delimited length of the blank. The molten material has a volumetric mass which gives off an amount of heat in its molten condition effective to drive moisture out of kiln dried wood. However, since the moisture level of the delimited length has been reduced, the problem of vaporization of the moisture from the wood is substantially eliminated.

Figure 2:
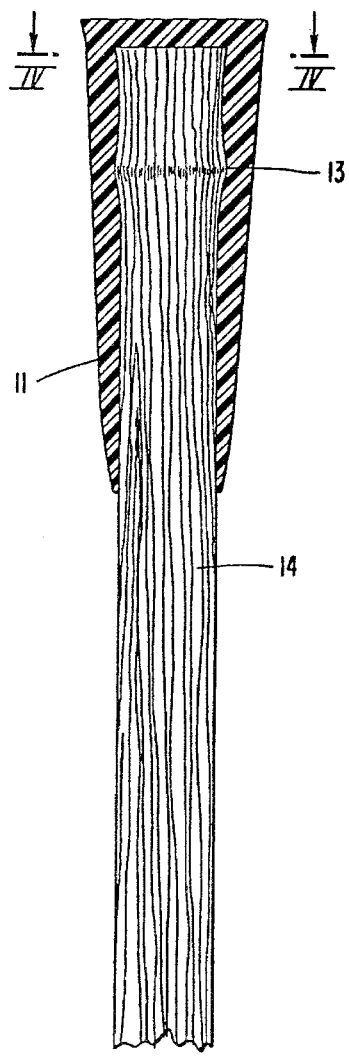
FIG. 2 is a fragmentary cross sectional view along the major axis of a handle made in accordance with this invention.
Figure 4:
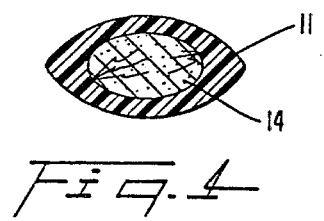
FIG. 4 is a sectional view along line IV—IV of FIG. 2.
Figure 3:
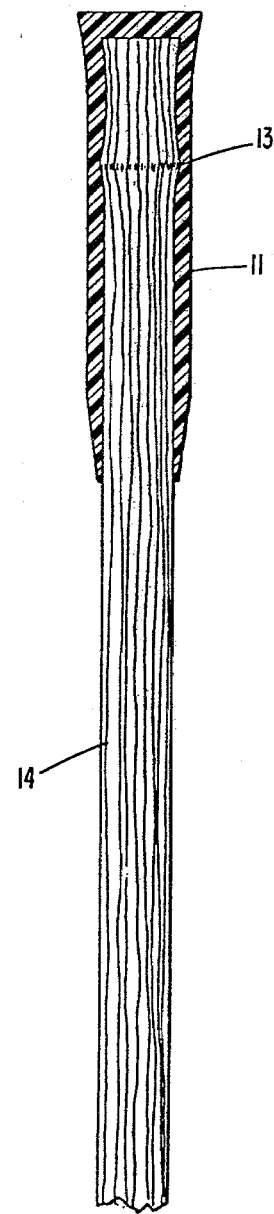
FIG. 3 is a fragmentary cross sectional view along the minor axis of the handle of FIG. 2.

Referring again to the axe handle as shown in FIGS. 2 and 3, the delimited length of the shaft 14 extends along the tool end portion. Once the moisture content is reduced to a level of at least below about 6% by weight as determined by the existing moisture measuring instruments, the delimited length is then placed into a mold cavity.

In one specific embodiment, FIG. 10 shows an assembly 22 including a mold 21 having a cavity 23 with the shape of a tool holding section for a double bit axe tool. The axe head 26 is disposed with the eye thereof disposed in the mold cavity along with a wood shaft 25 made in accordance with this invention. That is, the delimited length of the shaft 25 disposed within the cavity 23 has been subjected to a moisture reducing treatment. Once the mold is closed, a high impact material, namely, rubber modified polystyrene, is injected in molten form into the mold cavity at a temperature of from about 400° F. to 450° F. The molten material is injected into cavity 23 through inlet 24 under pressure of about 450 to 500 pounds per square inch.

The moisture reducing step may be effected by treating the delimited length of the shaft 25 by dielectric heating, microwave energy, ultrasonic waves, or through the action of an electrostatic field. In one specific embodiment, dielectric heating is used at a radio frequency of about 40 megahertz. The moisture reducing step is accomplished by holding the delimited area within the treating zone for a period of about 30 to 60 seconds to temporarily reduce the moisture content therein. A portion of the moisture will be expelled from the wood. A further portion of the moisture will be driven from the delimited length into an adjacent region of the blank. Care must be taken not to expose the delimited length of material too long to moisture reducing treatment because the wood will otherwise begin to burn. In other words, the kind of treatment should be sufficient to reduce the moisture but short enough to prevent burning or disintegration of the wood.

It is generally well known to dry wood materials using dielectric heating, microwave energy, ultrasonic waves and electrostatic field action. See particularly U.S. Pat. Nos. 3,670,133, 3,710,064 and 3,999,302. However, these particular methods of drying have never been used to be a part of a procedure whereby it is possible to now mold a high impact material directly to a wood shaft and still retain the natural handle strength characteristics of the wood after the molding step has been completed.

It has been unexpectedly found that the moisture within the wood shaft will redistribute itself within the handle and substantially equalize itself to the surrounding environmental conditions after the molding operation has been completed. This redistribution of the moisture within the wood shaft member enables the shaft member to have an amount of moisture sufficient to maintain the natural handle strength characteristics of the wood in the tool handle.

With the stop member 13 formed at the tool end portion of the wood shaft 14 as shown in FIG. 5, there is an interaction between the tool head 12 and the stop member 13 with respect to the material of the tool holding section 11 to increase the grip of the tool head 12. This type of action is not available in any existing wood handles or any synthetic handles having been made heretofore.

The total time for the overall process is 3 to 5 minutes depending upon the loading and unloading at the preheating work station and the molding work station. The time in the preheating work station has been effective to heat the wood in the delimited length to a temperature of about 250° F. The time in the mold cavity using the rubber modified, polystyrene is about ninety seconds. After the moisture reducing and molding steps, the molded end of the handle is quenched in water. The ambient temperature of the water was about 62° F.

To aid in the dissipation of heat within the mold, pins may be placed between the wood shaft and the mold cavity wall. These pins may also help in positioning the wood shaft within the mold cavity during the injection step of the process.

While the tool handle and method of making same has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A method of producing an elongated tool handle, said method comprising:
   (a) forming an elongated blank of kiln dried wood,
   (b) reducing the moisture level of said kiln dried wood along a delimited length of said elongated blank,
   (c) placing said moisture reduced delimited length into a mold cavity, and
   (d) injecting a molten, high impact material into said mold cavity to secure said material directly to said wood in the delimited length of said blank,
   (e) said molten material having a volumetric mass which gives off an amount of heat in its molten condition effective to drive moisture out of kiln dried wood.

2. The method as defined in claim 1 wherein the elongated blank has a tool end portion and a butt end portion, said delimited length extends along said tool end portion.

3. The method as defined in claim 1 wherein the elongated blank has a tool end portion and a butt end portion, said delimited length extends along said tool end portion, a first delimited length extends along said tool end portion and a second delimited length extends along said butt end portion.

4. The method as defined in claim 1 wherein said wood is hickory.

5. The method as defined in claim 4 wherein said high impact material is rubber-modified polystyrene.

6. The method as defined in claim 1 wherein the temperature of said molten material injected into the mold cavity is at a temperature of from about 400° F. to about 450° F.

7. The method as defined in claim 1 wherein the injecting step is effected under a pressure of about 450 to 500 pounds per square inch.

8. The method as defined in claim 1 wherein the moisture reducing step is effected by treating said delimited length with dielectric heating.

9. The method as defined in claim 8 wherein the dielectric heating is effected at a radio frequency of about forty megahertz.

10. The method as defined in claim 1 wherein the moisture reducing step is effected by treating said delimited length with microwave energy.

11. The method as defined in claim 1 wherein the moisture reducing step is effected by treating said delimited length with ultrasonic waves.

12. The method as defined in claim 1 wherein the moisture reducing step is effected by treating said delimited length with electrostatic field action.

13. The method as defined in claim 1 wherein the moisture reducing step includes driving moisture from said delimited length into an adjacent region of the blank.

14. The method as defined in claim 1 wherein the elongated blank has a tool end portion and a butt end portion, said delimited length extends along said tool end portion, the moisture reducing step includes driving moisture from the tool end portion of the blank toward said butt end portion.

15. The method as defined in claim 1 wherein said elongated blank forming step includes turning said blank to form stop means within said delimited area to aid in securing said molded material in place.

* * * * *